Patented Oct. 14, 1952

2,614,086

UNITED STATES PATENT OFFICE 2,614,086

DYE BATH COMPOSITION

George F. Jones, Glens Falls, N. Y., assignor to Imperial Paper and Color Corporation, Glens Falls, N. Y., a corporation of New York No Drawing. Application March 9, 1950, Serial No. 148,750

7 Claims. (Cl. 260—15)

This invention relates to dye bath compositions, and more particularly to dye bath compositions in which the colorant is a pigment and not a dye. Still more particularly, this invention relates to pigmented dye bath compositions suitable for coloring textiles, of both natural and artificial fibers, paper, and the like.

In the following disclosure of my invention, I shall use the terms "pigment" and "dye" as defined by Hackh in "Hackh's Chemical Dictionary," second edition, P. Blakiston's Son & Co., Inc., Philadelphia (1937). Hackh defines "pigment" as: "Any coloring material that is finely powdered and insoluble and is used suspended in a vehicle, as a paint." "Dye" is defined as: "A coloring matter which is used in solution for staining materials as opposed to pigments which are used in suspension for painting."

Experience in the application of conventional dyes for the coloring of textiles, for example, has shown that such processes possess certain inherent undesirable characteristics, which have been accepted as necessary in the art. For example, it has long been recognized that the light resistance of dyes is of a lower order than that to be expected from pigments. While certain dyes, particularly certain of those known as vat dyes, have satisfactory light resistance even in pale or pastel hues, the processing cost incurred in the production of such pastel shades is such that they are rarely used. Further, when attempts are made to dye textiles woven from mixed fiber, such as acetate rayon, viscose rayon, cotton-viscose rayon, etc., it is found in many instances that the different types of fibers accept the dye to a different extent: the dye colors one fiber more strongly than the other with the result that a non-uniform, mottled effect is produced. This effect is conventionally attributed to a difference in degree of "substantiveness" of the various fibers present.

In efforts to avoid the disadvantages of dyes in textile coloring, attempts have been made in the past to replace the dye colorant with pigments in conjunction with a binder. The intent of such substitution was to secure better light resistance than could be obtained from dyes at lower cost, and to avoid the difficulties of unevenness of dyeing experienced in coloring mixed fibers. Although costs of coloring were lowered and better light fastness was secured in these attempts, additional difficulties arose: adhesion to the textile of the pigment-binder systems employed was inferior to that of dyeings of identical hue, as evidenced by the results of scrub tests. Further, certain of the binders employed had poor resistance to dry cleaning fluids.

I have discovered that the deficiencies of "dyeings" obtained from previous pigment-binder systems can be circumvented by the use of a unique, water soluble, modified cationic melamine formaldehyde resin; such a resin is the subject of my co-pending patent application Serial Number 148,748, filed March 9, 1950.

This resin is the product resulting from the reaction of melamine, triethanolamine, glycerine, and formaldehyde, temporarily made acid at a pH of from 0.5 to 2.0 and subsequently neutralized to a pH of from 6 to 7. The process requires that for each mol of melamine at least 7½ mols of formaldehyde, from one to four mols of glycerine, and from one to three mols of an alkylol amine, such as triethanolamine or diethanolamine, be present. The melamine, formaldehyde, glycerine, and alkylol amine are heated together with agitation until a homogeneous clear solution is obtained. The solution is then acidified with hydrochloric acid or other mineral acid to a pH of from 0.5 to 2.0, and then neutralized back with caustic or other suitable chemical to a pH of from 6 to 7 before the resin has a chance to polymerize to a stage where it precipitates or sets up as a solid gel.

The dye bath compositions of my invention produce colorings having excellent crock, scrub, and dry cleaning fluid resistance.

It is my belief that the reasons for the novel and unexpected improvements in washability and crock resistance of my pigment-binder system are to be found in the facts that my binder is extremely cationic in electrostatic response and that the surface of the usual textile fibers are of opposite electrical character, or anionic. Since the binder and surface to which it is applied bear opposite electrical charges, the mutual neutralization of opposite charges creates an extremely strong bond, holding the binder, containing the pigment, tenaciously to the material to which it is applied, with the production of a uniformly colored, washable, crock resistant "dyeing." The cationic nature of my binder is of such a high order that differences in anionic character of the surface to which it is applied are of little significance in my process. I believe that the indifferent success attained in previous attempts at pigment dyeing is due to the lack of recognition of the necessity of using as a binder a material carrying very strong electrical charges opposite in sign to the surface to be colored.

A resin which is well suited for the carrying out of my invention is made as follows:

840 grams of melamine, 2333 grams of triethanolamine and 1836 grams of glycerine were mixed and heated to 80° C. To the hot mixture were added 3074 grams of 37.1% formaldehyde, and 1200 grams of 95% paraformaldehyde. The temperature was maintained at 80° C. and the mixture stirred for 15 minutes. At the end of this time 32% hydrochloric acid was slowly added during the following 30 minutes, the addition being carried out while stirring the mixture and maintaining the temperature at from 72° to 82° C. until a pH of 1.5±.2 was reached. The resulting resin solution was stirred for 1 minute, and then neutralized by the addition of 20% sodium hydroxide while stirring and maintaining the temperature at 70° C. When the pH reached 6.3, the resin was complete.

For economy in shipment the solution was concentrated under vacuum to a solids content of about 75%; concentration above this point should not be attempted.

The cationic nature of my resin may readily be demonstrated in either of two ways:

By one method an 800 cc. beaker is fitted with a seat of electrodes connected to a regular 6-volt storage battery. The anode is preferably platinum (although steel can be used) in the form of a rectangle 2″ x 5″. The cathode is a rectangular piece of 40 mesh steel screen having the same dimensions as the anode. The electrodes are placed one inch apart and 700 cc. of aqueous 5% resin solution are placed in the beaker. The circuit is closed and a potential of 6 volts is put across the electrodes. If the resin is cationic, it will be observed to coalesce on the cathode as a white insoluble deposit. Non-cationic resins show either no coalescence on either electrode or coalesce on the anode. Resins meeting the above test can be considered positively charged resins. The resin coalesces on the cathode quite readily.

A second test which may be readily applied consists of adding bentonite to a solution of the resin. By this method a 2% bentonite dispersion in water is diluted to about 20 to 1 with more water and is added to a 1% solution of the resin. If the resin is cationic it will flocculate or precipitate as curds.

The composition of one of my pigmented dye baths is as follows:

| | Per cent |
|---|---|
| Water dispersed pigment | 0.5 |
| Hydroxy ethyl cellulose | 0.235 |
| Cation active dispersing agent | 0.025 |
| Cationic melamine-formaldehyde resin | 3.25 |
| Water to | 100.00 |

The water dispersed pigment may be produced by any of the methods well known in the art. The hydroxy ethyl cellulose is used as a protective colloid; its use promotes levelness of dyeing. Methyl cellulose may be used as a replacement for hydroxy ethyl cellulose. The cation active dispersing agent is used to prevent pigment flocculation, thus enhancing stability of the dye-bath. I prefer to use Triton K-60, of Rohm & Haas, Philadelphia, Pa., although other cationic active dispersing agents are satisfactory. Triton K-60 is an aqueous dispersion of stearyl dimethyl benzyl ammonium chloride, supplied as a paste containing 25% of the quaternary ammonium salt. The cationic resin is the glycerine, triethanolamine modified melamine formaldehyde resin disclosed previously.

The amount of cationic resin employed depends upon the pigment concentration of the dye bath. The following table shows the optimum resin concentration in the dye bath at several pigment concentrations:

| Pigment Concentration | Percent of Resin in Dye Bath |
|---|---|
| 0.1% | 1.46 (Solids). |
| 0.2% | 1.90. |
| 0.5% | 3.25. |
| 1.0% | 5.75. |
| 1.5% | 8.50. |
| 2.0% | 11.65. |

The material to be colored is immersed in the dye bath, the excess bath removed by padding, and the material dried at 250–300° F. to cure the resin. Colorings having excellent washability, crock resistance and levelness of dyeing are obtained.

I claim:

1. An aqueous pigmented dyeing composition for dyeing textile materials which comprises a dispersed pigment, water and a cationic resin, said resin being the product prepared by reacting together in the presence of heat and agitation melamine, formaldehyde, glycerine and an alkylol amine in the proportion of 1 mol of melamine, at least 7½ mols of formaldehyde, 1 to 4 mols of glycerine and from 1 to 3 mols of an alkylol amine until a homogeneous clear solution is obtained, acidifying the resulting product to a pH of from 0.5 to 2.0 and then neutralizing the product to a pH of from 6 to 7, the amount of resin solids varying from 1.4% at a 0.1% pigment concentration to 11.65% at a 2% pigment concentration.

2. A dye bath which comprises a dispersed pigment, a cationic resin and water, said resin being the product prepared by reacting together in the presence of heat and agitation melamine, formaldehyde, glycerine and an alkylol amine in the proportion of 1 mol of melamine, at least 7½ mols of formaldehyde, 1 to 4 mols of glycerine and from 1 to 3 mols of an alkylol amine until a homogeneous clear solution is obtained, acidifying the resulting product to a pH of from 0.5 to 2.0 and then neutralizing the product to a pH of from 6 to 7, the amount of resin solids varying from 1.4% at a 0.1% pigment concentration to 11.65% at a 2% pigment concentration.

3. An aqueous pigmented coloring composition which comprises a dispersed pigment, at least 0.1% of a protective colloid selected from the group consisting of hydroxyethyl cellulose and methyl cellulose, water, and a cationic resin, said resin being produced by reacting together in the presence of heat and agitation melamine, formaldehyde, glycerine and an alkylol amine in the proportion of 1 mol of melamine, at least 7½ mols of formaldehyde, 1 to 4 mols of glycerine and from 1 to 3 mols of an alkylol amine until a homogeneous clear solution is obtained, acidifying the resulting product to a pH of from 0.5 to 2.0 and then neutralizing the product to a pH of from 6 to 7, the amount of resin solids varying from at least 1.4% at a pigment concentration of 0.1% to 11.65% at a pigment concentration of 2.0%.

4. An aqueous pigmented coloring composition which comprises from 0.1% to 2.0% of dispersed pigment, at least 0.1% of a protective colloid selected from the group consisting of hydroxyethyl cellulose and methyl cellulose, at least 0.02% of a cationic active dispersing agent, water and a cationic resin, said resin being the product prepared by reacting together in the presence of heat and agitation melamine, formaldehyde, glycerine and an alkylol amine in the proportion of 1 mol of melamine, at least 7½ mols of formaldehyde, 1 to 4 mols of glycerine and from 1 to 3 mols of an alkylol amine until a homogeneous clear solution is obtained, acidifying the resulting product to a pH of from 0.5 to 2.0 and then neutralizing the product to a pH of from 6 to 7 the cationic resin solids varying from at least 1.4% at a 0.1% pigment concentration to at least 11.65% at a 2.0% pigment concentration.

5. The coloring composition of claim 4 in which cationic dispersing agent is an aqueous dispersion of stearyl dimethyl benzyl ammonium chloride.

6. The coloring composition of claim 4 in which the alkylol amine is predominately triethanolamine.

7. The coloring composition of claim 4 in which the alkylol amine is predominately diethanolamine.

GEORGE F. JONES.

REFERENCES CITED

The following references are of record in the file of this patent:

UNITED STATES PATENTS

| Number | Name | Date |
| --- | --- | --- |
| 2,364,692 | Cassel | Dec. 12, 1944 |